Jan. 6, 1970  R. J. NIKSARIAN  3,488,492
DIRECTIONAL RADIATION SENSING APPARATUS
Filed March 28, 1968  2 Sheets-Sheet 1
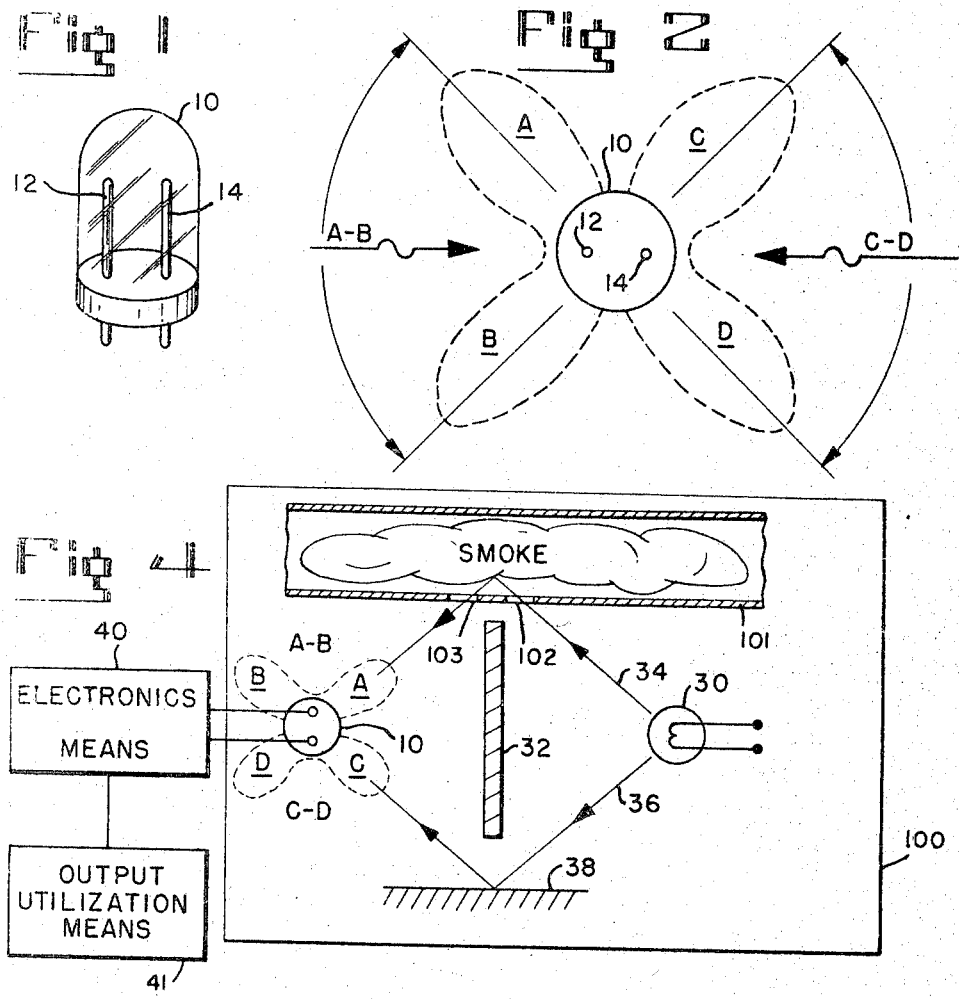
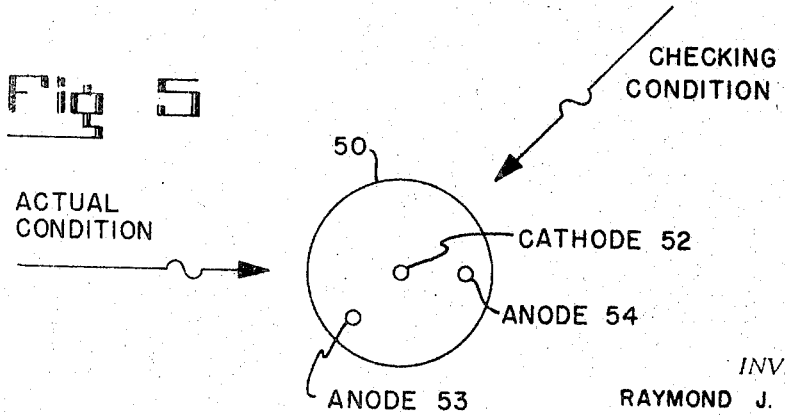
INVENTOR.
RAYMOND J. NIKSARIAN
BY
ATTORNEY.

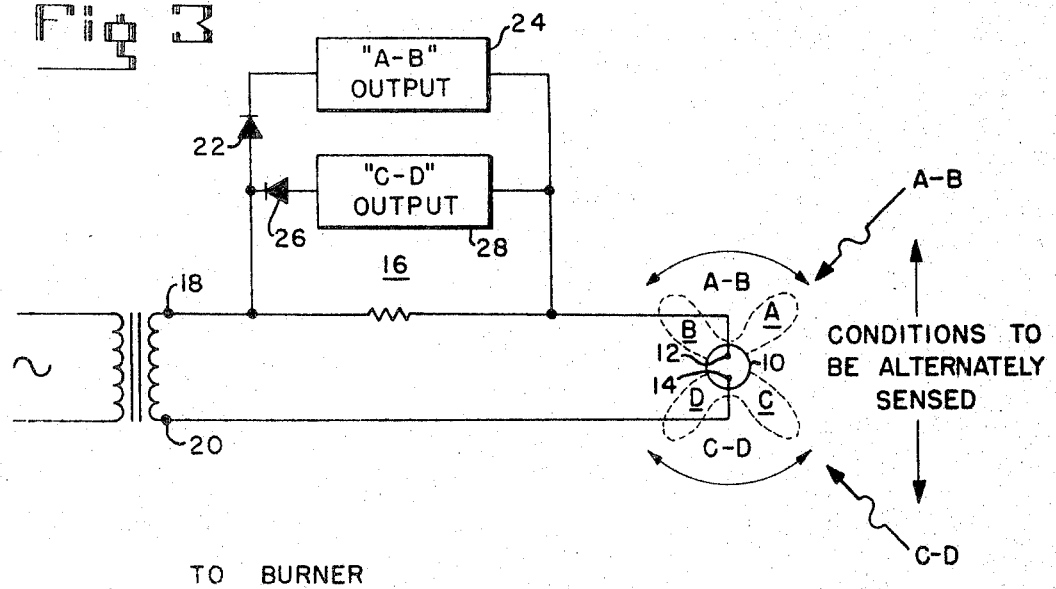
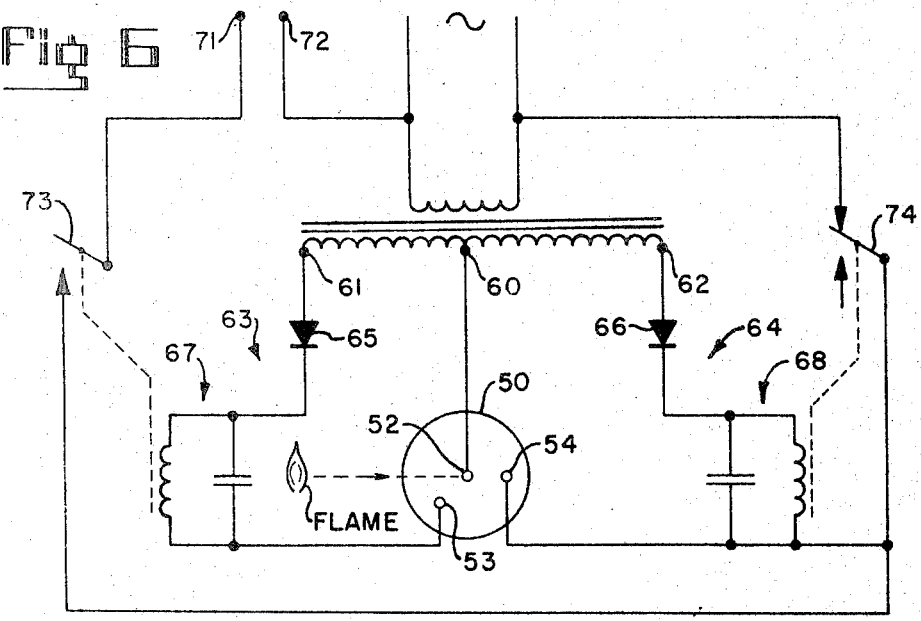

United States Patent Office 3,488,492
Patented Jan. 6, 1970

3,488,492
DIRECTIONAL RADIATION SENSING APPARATUS
Raymond J. Niksarian, Los Angeles, Calif., assignor to Honeywell Inc., Minneapolis, Minn., a corporation of Delaware
Filed Mar. 28, 1968, Ser. No. 716,899
Int. Cl. G01n 21/26
U.S. Cl. 250—43.5       3 Claims

ABSTRACT OF THE DISCLOSURE

A directional radiation sensing apparatus having a sensor including a plurality of electrodes, the directional sensing characteristics of the sensor depending upon which of the electrodes is the anode and which is the cathode, and having an energizing circuit connected to the sensor for alternately applying voltages to the electrodes to cause the directional sensitivity to alternate between two different directions, and including a plurality of outputs from the energizing circuit which can be used to self-check the integrity of the sensor.

BACKGROUND OF THE INVENTION

Prior art self-checking devices generally utilize a sensor with mechanical means to cyclically subject the sensor to a simulated critical condition and then to a supervised area where the critical condition may actually occur.

SUMMARY OF THE INVENTION

This invention is generally concerned with radiation sensitive self-checking apparatus wherein self-checking is accomplished completely electronically without mechanical aid. The invention is more particularly concerned with directionally sensitive, electronically operable, radiation detector apparatus for sensing radiation from different directions, which radiation is indicative of a condition to be sensed, detected or monitored.

A specific use for the broad idea is suggested wherein a forward scattering smoke detector of the UV photometric type is provided. The detector structure includes a UV source and a bi-directionally sensitive UV sensor. The detector is constructed in such a way as to provide means for directing the radiation originating at the UV source in two separate paths. One path guides light to an environment wherein smoke is to be detected. If smoke is present the UV radiation is reflected or scattered to the UV sensor from a first direction. The second path guides the radiation directly to the UV sensor from a second direction without exposing the radiation to smoke. Electrical means is attached to the sensor which alternately causes the sensor to sense radiation from the first direction and the second direction thereby providing an electrical chopping action. Radiation from the direction of the smoke environment and then radiation from the second direction is thus alternately sensed by the sensor. During one period, the sensor monitors the first direction to check for the absence of smoke. During the alternate self-checking period, the sensor is intentionally subjected to UV radiation to check its ability to sense smoke if and when smoke occurs. There is thus provided an apparatus with alternate periods of self-checking.

Another specific use is suggested wherein a burner control apparatus with self-checking features is provided. For example, if a two or three electrode bi-directional UV sensor is used with the proper electrical means, the sensor may be exposed to radiation impinging on it from one direction which is indicative of an actual condition to be sensed, such as flame from a burner, and the sensor may alternately be exposed to a simulated condition, such as the absence of flame, from a second direction. During the period when the sensor is exposed to the actual flame, it is sensing and monitoring the desired condition. During the alternate periods, when the sensor is exposed to the simulated condititon, it is self-checking for its ability to sense the absence of flame, should the actual flame be extinguished. This type of combination checks for a shorted or run-away UV sensor by exposing the sensor to the absence of UV during the alternate periods. An output in such a situation indicates a run-away sensor.

BRIEF DESCRIPTION OF THE DRAWING

FIGURE 1 is a pictorial representation of a bi-directional radiation sensor utilized in the present invention;

FIGURE 2 is a schematic diagram showing the directional sensing characteristics of the bi-directional sensor of FIGURE 1;

FIGURE 3 is a schematic diagram of an electrical circuit for use with the sensor of FIGURE 1 whereby the sensor is enabled to electrically sense radiation from different directions;

FIGURE 4 is a schematic diagram of a forward scattering or forward reflecting smoke detector in accordance with the present invention;

FIGURE 5 is a schematic diagram showing the directional sensing characteristics of a second type of bi-directional sensor for use in the present invention, and FIGURE 6 is a schematic diagram of a circuit for use with the sensor of FIGURE 5 whereby a self-checking burner control apparatus is provided.

DESCRIPTION OF THE PREFERRED EMBODIMENTS

FIGURE 1 discloses a bi-directional radiation sensor 10 of the general type disclosed in U.S. Patent 3,344,302 which issued to R. O. Engh and R. G. Johnson on Sept. 26, 1967. The electrode structure of the sensor shown in FIGURE 1 has been modified to provide directional sensitivity to impinging radiation since it has been discovered that when this type of detector is provided with a pair of relatively straight wire type electrodes 12 and 14, as shown in FIGURES 1 and 2, the detector possesses bi-directional sensitivity. This sensitivity pattern reverses with reversal of the voltage polarity applied to the electrodes, provided the rate of reversal is compatible with ionization or quenching times and the like. The same effect can be had by the use of a three electrode sensor as will be discussed hereinbelow.

In FIGURE 2, the bi-directional sensitivity of the detector of FIGURE 1 is schematically indicated by lobes A and B, C and D. The arc from lobe A to lobe B indicates sensor sensitivity with maximum sensitivity in lobes A and B for radiation impinging upon the sensor from the general direction A–B. The direction indicated by the arc from lobe C to lobe D indicates sensor sensitivity with maximum sensitivity in lobes C and D for radiation from the general direction indicated as C–D.

Referring now to FIGURE 3, a circuit is shown by means of which the directional sensitivity of the sensor may be used to alternately sense radiation from two different directions. As shown in the figure, radiation, which may be indicative of a first condition, is shown impinging upon detector 10 from the general direction A–B. Radiation, which may be indicative of another condition or a similar condition, is shown impinging upon detector 10 from a second direction C–D.

Detector 10 is connected into an electrical circuit generally designated 16 having power input terminals 18 and 20 adapted to be connected to a source of AC. A first circuit means is connected between terminal 18 and electrode 12 which comprises diode 22 and output means 24.

A second circuit means is connected between terminal 18 and electrode 12 which comprises diode 26 and output means 28.

In operation, on a first half cycle of the AC source, with electrode 12 positive and electrode 14 negative, sensor 10 is activated into a sensing condition whereby radiation from the direction A–B may be sensed while radiation impinging upon sensor 10 from direction C–D cannot be sensed. If radiation from direction A–B impinges upon sensor 10 during this first half cycle, the sensor will be conductive and output means 24 will be activated. Output means 24 may include many types of output devices and may also be adapted to activate, deactivate or otherwise control a wide variety of output responsive devices.

On a second half cycle of the AC source, when electrode 14 is positive while electrode 12 is negative, sensor 10 will again be placed in an active condition for sensing. However, during this second half cycle only radiation impinging upon sensor 10 from direction C–D will render sensor 10 conductive. If radiation from direction C–D is in fact impinging upon sensor 10 during this half cycle, the sensor will be rendered conductive and output means 28 thereby activated. As previously mentioned, output means 28 may be any variety of electrically responsive output devices and may be connected to a wide variety of output responsive devices which are to be controlled or the like.

Referring now to FIGURE 4, a smoke detector of the forward scattering or forward reflection type is schematically illustrated which makes use of the bi-directional characteristics of the UV sensor 10 and is provided with self-checking features.

Two of the basic requirements established in the prior art for the detection of scattered or reflected light from smoke are an active source and at least one sensor. An additional sensor or an additional source has been suggested as a means of assuring the detection of a failure, especially the type of failure characterized by a "dead" or non-conductive sensor. Also a method of diverting the optical path alternately between a first path, including the smoke, to a second path, which is direct between source and sensor by means of optical chopping, with a vibrating shutter or analogous technique has also been used to assure the detection of a malfunctioning radiation sensor. The embodiment described in connection with FIGURE 4 possesses the advantages of such redundant and mechanical systems without the disadvantages of redundancy and mechanical action.

As schematically shown in FIGURE 4, the smoke detector includes a sensor 10 suitably positioned to receive radiation from two different directions via the A–B sensitivity zone and the C–D sensitivity zone. A source of UV such as an electrical lamp 30 is suitably positioned to provide radiation to be received by detector 10. Blocking means 32 is positioned between detector 10 and UV source 30 to prevent the direct impingement of radiation from source 30 on sensor 10. Means 32 may assume a wide variety of shapes and structures. It is essential only that means 32 be so shaped and positioned with respect to sensor 10 and source 30 such that it establishes two paths by means of which radiation may impinge upon sensor 10 from two different directions. These paths are indicated in the figure as path 34 and path 36. Radiation from source 30 along the first path 34 will impinge upon sensor 10 from a first direction only when smoke or other particulate matter is present to cause a reflection or a scattering of the radiation to sensor 10. Radiation from source 30 directed along the second path 36 will continuously impinge upon sensor 10 when reflected by mirror means 38 which is suitably positioned to accomplish this end. Sensor 10 is shown connected to electronic means 40 which may include a simple circuit of the type shown in FIGURE 3 or which may include a wide variety of suitable components to achieve a like function. The only essential feature being that the electronic means 40 be of the type for alternately poling the electrodes of sensor 10 to achieve bi-directional sensing of the radiation alternately from first path 34 and from second path 36. The electronic means should also include or be connected to suitable output utilization means 41 such as an alarm bell or light for signaling.

Housing means 100 encloses radiation source means 30, path establishing means 32 and sensor 10. Conduit means 101, in housing means 100, is constructed and arranged to allow the passage therethrough of vapor samples to be monitored for the presence of particles. Path establishing means 32 further includes entrance means 102 and exit means 103. The entrance and exit means are positioned in the conduit means whereby the first path 34 is established for the radiation, beginning at source means 30, progressing into conduit 101 via entrance means 102 and, when particles are present in the sample, the radiation is at least partially reflected toward sensor 10 via exit means 103, whereby the presence of particles is detected.

In much the same manner as the two electrode sensor previously described herein, the three electrode sensor of FIGURE 5, which includes cathode 52 and anodes 53 and 54, is also directionally sensitive. The electrodes are wire electrodes of the type shown in FIGURE 1. As schematically indicated in FIGURE 5, the sensor may be subjected to radiation indicative of an actual condition, such as flame, and it may also be subjected to a checking condition, which condition may be either radiation or lack of radiation. Under such circumstances, if anode 53 and cathode 52 are properly energized, sensor 50 will be activated and sense radiation indicative of the actual condition from the direction indicated. If during another period, such as an alternate AC half cycle cathode 52 and anode 54 are properly energized, the sensor will be activated to sense the checking condition, which may be either radiation or the lack of it.

An apparatus of the type discussed generally in FIGURE 5 is shown in FIGURE 6 wherein the two anode arrangement is used for self checking against a "runaway" or shorted type of failure in the sensor to provide a self-checking burner control apparatus. As schematically shown in the figure, sensor 50 is positioned such that anode 53 and cathode 52 are able to sense radiation from the flame whereas anode 54 and cathode 52 are at a different position and are unable to sense the flame radiation. For reference, the anode 53—cathode 52 half of sensor 50 will be referred to as the sensing portion and the anode 54—cathode 52 half of the sensor will be referred to as the checking portion.

In the figure, reference numerals 60, 61 and 62 designate power input terminals adapted to be connected to a source of AC as shown. Terminal 60 is connected to cathode 52.

A first circuit means referred to as the sensing circuit and generally designated as 63 is connected between terminal 61 and anode 53. Sensing circuit 63 includes diode 65 and a first relay output means generally designated as 67.

A second circuit means, referred to hereinafter as the checking circuit and designated generally as 64 is connected between terminal 62 and anode 54. Checking circuit 64 includes diode 66 and a second relay output means generally designated as 68.

A third circuit means generally designated as 70 includes a pair of terminals 71 and 72 adapted to be connected to control the operation of a burner. Circuit 70 also includes normally open switch 73 and normally closed switch 74 which are controlled by relay means 67 and 68 respectively.

In operation, as long as the sensing side of sensor 50, comprising cathode 52 and anode 53, senses flame during alternate half cycles of the AC source when anode 53 is positive and cathode 52 is negative, switch 73 is maintained in a closed condition by relay means 67. The opposite alternate half cycles of the AC source, when anode 54 is positive and cathode 52 is negative, comprise a self-checking period. The checking portion of sensor 50, comprising cathode 52 and anode 54, which is insensitive to radiation from the flame since it is impinging upon sensor 50 from an improper direction insofar as the checking portion of the sensor is concerned, will normally be inactive during the self checking period as will be checking circuit 64. Therefore, normally closed switch 74 will remain in a closed condition. The circuit to terminals 71 and 72, and to the burner, is thereby complete.

Should sensor 50 become active during the self checking period, it will be indicative of the fact that the sensor is detecting flame when none is actually present and is therefore indicative of the fact that the sensor has failed. In this event, the checking circuit means 64 will be activated to open switch 74 via relay means 68 and the burner will be shut down.

The embodiments of the invention in which an exclusive property or right is claimed are defined as follows:

1. Self checking apparatus for detecting radiation, comprising:
   an electrically operable radiation detecting sensor having a plurality of electrodes, said sensor being rendered directionally sensitive in a first or a second direction respectively in accordance with the selective energization of said plurality of electrodes in a first or a second mode of energization;
   means associated with said sensor to restrict its simultaneous viewing direction to said first and second direction, and
   electrical means connected to said sensor for selectively and cyclically energizing said sensor in said first and then said second mode of energization respectively during alternate first and second intervals to thereby render said sensor sensitive in said first direction during said first intervals and in said second direction during said second intervals.

2. The combination of claim 1 wherein there is included:
   radiation source means;
   the means associated with the sensor establishes at least two paths for the radiation from the source means whereby it impinges upon the sensor from two different directions, one path allowing the radiation to be modified by a condition to be monitored, the other path allowing the radiation to impinge upon the detecting means without substantial modification and
   the electrical means activates the sensor so as to cyclically detect radiation from first one path and then the other during the alternate time intervals.

3. The combination of claim 2 wherein the condition to be monitored is the presence of particulates in a vapor and the apparatus further includes:
   housing means enclosing the radiation source means, the path establishing means and the sensor,
   conduit means in the housing means constructed and arranged to allow the passage therethrough of vapor samples to be monitored for the presence of particulates, and
   the path establishing means further includes entrance and exit means positioned in the conduit means whereby the first path is established for the radiation beginning at the source means, progressing into the conduit via the entrance means and, when particulates are present in the sample, the radiation is at least partially reflected toward the sensor via the exit means whereby the presence of particulates is detected.

References Cited
UNITED STATES PATENTS

| 2,237,193 | 4/1941 | Mobsby. | |
| 3,207,903 | 9/1965 | Abromaitis et al. | 250—83.6 |
| 3,299,416 | 1/1967 | Koppel | 340—228 |
| 3,415,984 | 12/1968 | Früngel. | |

ARCHIE R. BORCHELT, Primary Examiner

U.S. Cl. X.R.

250—83.3; 340—228